2,983,746
DIFLUOROORGANOCHLOROSILANES

Donald D. Smith, Eldon E. Frisch, and Ogden R. Pierce, Midland, Mich., assignors to Dow Corning Corporation, Midland, Mich., a corporation of Michigan No Drawing. Filed June 4, 1958, Ser. No. 739,662

4 Claims. (Cl. 260—448.2)

This invention relates to (1) chlorosilanes containing a 3,3-difluoropropyl radical and methyl radicals and (2) the siloxanes produced from these chlorosilanes.

More specifically this invention relates to silanes of the formula

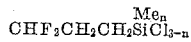

in which $n$ has a value of from 0 to 2.

The silanes of this invention are best prepared by adding 3,3-difluoropropene to a silane of the formula $Me_nSiHCl_{3-n}$. The silane adds to the double bond of the olefin to give the chlorosilanes of this invention. The reaction is best carried out at temperatures from 150° to 300° C. and in the presence of a peroxide or platinum catalyst.

3,3-difluoropropene is prepared by reacting 1,3-dichloropropene with HF in the presence of a fluoride of such metals as vanadium, chromium, managanese, iron, cobalt, nickel, titanium and silver at a temperature of at least 150° C. This preparation is more fully described in applicants' copending application Serial No. 686,037, filed September 25, 1957, now abandoned, and assigned to the assignee of this invention.

This invention also relates to polysiloxanes consisting essentially of units of the formula

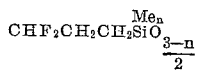

and up to 5 mol percent units of the formula

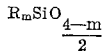

in which each R is a phenyl, methyl or vinyl radical, each $m$ has an average value of from 1 to 3 and each $n$ has a value of from 0 to 2.

The homopolymers of this invention are produced by hydrolyzing the chlorosilanes of this invention in the conventional manner and subsequently heating the resulting hydrolyzate with an alkali metal hydroxide or an alkali metal salt of a siloxane.

Where elastomeric gums and linear polymers are desired, one hydrolyzes the difluoropropylmethyldichlorosilane and then heats the resulting hydrolyzate with an alkali metal hydroxide to crack out the cyclotrisiloxane. The method of production of this cyclic trimer is the same as that described in the copending application Serial No. 594,108, filed June 27, 1956, by Ogden R. Pierce and George W. Holbrook and assigned to the assignee of this invention. This cyclic trisiloxane

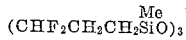

can then be polymerized to a gum by heating in the presence of such alkaline catalysts as alkali metal hydroxides, quaternary ammonium hydroxides and siloxane salts of these hydroxides in a manner similar to that shown in the copending application Serial No. 594,107, filed June 27, 1956, now abandoned by Oscar K. Johannson and assigned to the assignee of this invention. With no siloxane endblocking units present, the polymers will be hydroxy-endblocked.

The copolymers of this invention can contain up to 5 mol percent units of the formulae $RSiO_{1.5}$, $R_2SiO$ and $R_3SiO_{.5}$, where R is phenyl, methyl or vinyl without seriously affecting the thermal and solvent resistance of the composition.

These are best introduced by mixing cyclic siloxanes containing these non-fluorinated units with the 3,3-difluoropropylmethylsiloxane cyclic trimer and heating the mixture in the presence of the alkaline catalysts shown above. In this manner such units as $Me_2SiO$, $PhMeSiO$ and $MeViSiO$ are easily introduced by employing the corresponding cyclic trisiloxane or in the case of $Me_2SiO$ the cyclic tetramer also. Alkaline polymerization is also effective in introducing $RSiO_{1.5}$ units.

Where it is desired to prepare copolymer fluids of diorganosiloxane and triorganosiloxane units, the best method is to copolymerize the siloxanes in the presence of trifluoromethanesulfonic acid or 1,1,2,2,-tetrafluoroethanesulfonic acid as shown in the copending application Serial No. 726,627, filed April 7, 1958, by Ogden R. Pierce and George W. Holbrook and assigned to the assignee of this invention.

The chlorosilanes of this invention are useful per se as hydrophobing agents for ceramic, wood and other surfaces and as intermediates in the preparation of siloxanes. The siloxanes of this invention are useful as lubricants, dielectric fluids, hydraulic fluids, water repellent agents and as intermediates in the preparation of siloxane rubbers and resins which have greater thermal stability and solvent resistance than the corresponding non-fluorinated siloxanes.

The following examples are illustrative and are not intended to limit this invention which is properly delineated in the claims.

EXAMPLE 1

Alumina impregnated with manganese dichloride was placed in an electrically heated metal tube 1 inch in diameter and 3 feet long. The mixture was heated to 200° C. in an atmosphere of HF to convert the manganese dichloride to manganese difluoride. A mixture of $CHCl=CHCH_2Cl$ and anhydrous HF were passed through the tube at 200° C. in a ratio of 63 ml. of olefin per 130 liters of HF. There was obtained a product consisting of 90 to 95 percent by weight $CHF_2CH=CH_2$ having a boiling point of 0.0 to 4.0° C. This material was further identified by bromination of a sample in carbon tetrachloride solution to yield 1,2-dibromo-3,3,-difluoropropane having a boiling point of 63.5° C. at 29 mm. Hg and $n_D^{25}$ of 1.4767.

Methyldichlorosilane was mixed with the 3,3-difluoro-1-propene in a ratio of 4 mols to 1 mol and heated to 250° C. in a closed system. After the system was cooled to room temperature and vented, the reaction mixture was distilled to yield 3,3-difluoropropylmethyldichlorosilane having the following properties: B.P. 149.5 to 151° C.; $n_D^{25}$ 1.4091.

An ether solution of the above chlorosilane was shaken with sufficient water to provide a final HCl concentration of 20 percent by weight. The mixture was separated. The ether layer was washed with water until neutral and dried. The ether was removed by distillation and 0.5 percent by weight powdered potassium hydroxide was added to the residue. Further distillation yielded a product boiling at 185° to 190° C. at 10 mm. Hg. This distillate was mixed with 0.5 percent by weight powdered KOH and fractionated to yield 3,3-difluoromethylsiloxane cyclic trimer (B.P. 120° to 121°

C. at 0.5 mm. Hg; $n_D^{25}$ 1.3966) and the corresponding cyclic tetramer (B.P. 150° C. at 0.5 mm. Hg; $n_D^{25}$ 1.3989).

siloxanes shown by heating in the presence of KOH, hydroxy-endblocked copolymers will be formed as follows:

Table

| Unit | Present as mixture of | No. of mols of unit | Average formula of copolymer |
|---|---|---|---|
| Me$_2$SiO | (Me$_2$SiO)$_3$ <br> (Me$_2$SiO)$_4$ | 5 | HO (HCF$_2$CH$_2$CH$_2$Si$\overset{\text{Me}}{\text{O}}$)$_{100}$ (Me$_2$SiO)$_5$H |
| PhMeSiO | (PhMeSiO)$_3$ | 3 | HO (HCF$_2$CH$_2$CH$_2$Si$\overset{\text{Me}}{\text{O}}$)$_{100}$ (PhMeSiO)$_3$H |
| PhViSiO | (PhViSiO)$_3$ | 1 | HO (HCF$_2$CH$_2$CH$_2$Si$\overset{\text{Me}}{\text{O}}$)$_{100}$ (PhViSiO)H |
| MeSiO$_{1.5}$ | monomethylsilsesquioxane | 1 | HO (HCF$_2$CH$_2$CH$_2$Si$\overset{\text{Me}}{\text{O}}$)$_{100}$ (MeSiO$_{1.5}$)H |

EXAMPLE 2

When one mol of 3,3-difluoropropene is reacted with one mol of the following chlorosilanes by the method shown in Example 1 and the resulting fluoroorganochlorosilanes shown below are hydrolyzed in accordance with the procedure in Example 1, siloxanes of the unit formulae listed below are obtained:

| | Silane Product | Siloxane Unit |
|---|---|---|
| SiHCl$_3$ | CHF$_2$CH$_2$CH$_2$SiCl$_3$ | CHF$_2$CH$_2$CH$_2$SiO$_{1.5}$ |
| Me$_2$SiHCl | CHF$_2$CH$_2$CH$_2$Si$\overset{\text{Me}_2}{\text{Cl}}$ | CHF$_2$CH$_2$CH$_2$Si$\overset{\text{Me}_2}{\text{O}_{.5}}$ |

EXAMPLE 3

When 199 mols of 3,3-difluoropropylmethylsiloxane units present as cyclic trimer and 1 mol of the following units present as the corresponding disiloxanes, where Vi is vinyl, Ph is phenyl and Me is methyl, are mixed with stirring with trifluoromethanesulfonic acid in amount to give and S/Si of 0.004 for 5 hours without heating and the acid catalyst is distilled off, the resulting products are linear 3,3-difluoropropylmethylpolysiloxanes endblocked with the appropriate units:

| Disiloxane | Endblocking units |
|---|---|
| Me$_3$SiOSiMe$_3$ | Me$_3$SiO$_{.5}$ |
| PhMe$_2$SiOSiMe$_3$ | Me$_3$SiO$_{.5}$ <br> PhMe$_2$SiO$_{.5}$ |
| (PhMeViSi)$_2$O | PhMeViSiO$_{.5}$ |
| a mixture of <br> ViMe$_2$SiOSiMe$_2$Vi <br> and Ph$_3$SiOSiPh$_2$Vi | ViMe$_2$SiO$_{.5}$ <br> Ph$_3$SiO$_{.5}$ <br> Ph$_2$ViSiO$_{.5}$ |

EXAMPLE 4

When 100 mols of 3,3-difluoropropylmethylsiloxane units present as the cyclic trimer are reacted with the following units in the amounts shown present as the That which is claimed is:

1. A silane of the formula $$CHF_2CH_2CH_2SiCl_{3-n}^{Me_n}$$

in which each $n$ has a value of from 1 to 2.

2. A siloxane composition consisting essentially of units of the formula $$CHF_2CH_2CH_2SiO_{\frac{3-n}{2}}^{Me_n}$$

and up to 5 mol percent units of the formula $$R_mSiO_{\frac{4-m}{2}}$$

in which each R is selected from the group consisting of phenyl, methyl and vinyl radicals, $m$ has an average value of from 1 to 3 and each $n$ has a value from 1 to 2.

3. A composition consisting essentially of $$(CHF_2CH_2CH_2SiO)_3^{Me}$$

4. A composition consisting essentially of $$(CHF_2CH_2CH_2SiO)_4^{Me}$$

References Cited in the file of this patent

UNITED STATES PATENTS 2,637,738  Wagner _____ May 3, 1953
2,860,152  Fletcher _____ Nov. 11, 1958

OTHER REFERENCES

McBee et al.: "Journal American Chemical Society," vol. 79 (May 5, 1957), pages 2329–32.
Tarrant: WADC Technical Report 55–220, August 1955, pages 12, 17, 19, 21 and 37.
Dyckes, ibid., part III, September 1957, pages 10, 18, 20 and 29–32.
McGregor: "Silicones and Their Uses," McGraw-Hill Book Co., Inc., N.Y., publishers (1954), pp. 268–72.